(12) United States Patent
Hayashi

(10) Patent No.: US 6,677,811 B2
(45) Date of Patent: Jan. 13, 2004

(54) POWER SUPPLY CIRCUIT AND RF TRANSPONDER IC

(75) Inventor: Joji Hayashi, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 275 days.

(21) Appl. No.: 10/002,673

(22) Filed: Oct. 31, 2001

(65) Prior Publication Data

US 2002/0066793 A1 Jun. 6, 2002

(30) Foreign Application Priority Data

Oct. 31, 2001 (JP) .................................. 2000-334025

(51) Int. Cl.[7] .............................. G05F 1/10; G05F 3/02
(52) U.S. Cl. ...................... 327/543; 327/541; 327/546; 235/492
(58) Field of Search ................................. 327/530, 538, 327/539, 540, 541, 543, 545, 546; 323/312, 316; 235/492

(56) References Cited

U.S. PATENT DOCUMENTS

| | | | |
|---|---|---|---|
| 5,365,161 A | 11/1994 | Inoue et al. ............... 323/282 |
| 5,812,021 A | * 9/1998 | Ikeda ........................ 327/541 |
| 5,825,214 A | 10/1998 | Klosa ........................ 327/104 |
| 5,850,139 A | * 12/1998 | Edwards ..................... 323/280 |
| 5,973,419 A | 10/1999 | Kruppa et al. .............. 307/131 |
| 2001/0028240 A1 | * 10/2001 | Fukui ........................ 323/280 |

FOREIGN PATENT DOCUMENTS

| | | |
|---|---|---|
| EP | 0 899 643 A1 | 3/1999 |
| EP | 0 994 401 A2 | 4/2000 |
| GB | 2 333 495 | 7/1999 |
| JP | 01-253014 | 10/1989 |
| JP | 10-201088 | 7/1998 |

* cited by examiner

Primary Examiner—Terry D. Cunningham
Assistant Examiner—Quan Tra
(74) Attorney, Agent, or Firm—Snell & Wilmer, LLP

(57) ABSTRACT

A power supply circuit of the present invention includes: a current detection circuit connected between a first power supply voltage section for applying a first power supply voltage to a first electronic circuit and a second power supply voltage section for applying a second power supply voltage to a second electronic circuit, the current detection circuit having a monitor terminal for monitoring a current flowing from the first power supply voltage section to the second power supply voltage section; and a current compensation circuit connected to the first power supply voltage section and the monitor terminal, the current compensation circuit controlling a compensation current flowing from the first power supply voltage section to a ground based on the monitored current to compensate for current fluctuations caused by load fluctuations of the second electronic circuit.

15 Claims, 8 Drawing Sheets

POWER SUPPLY CIRCUIT AND RF TRANSPONDER IC

BACKGROUND OF THE INVENTION

1. Field of the Invention

The present invention relates to a power supply circuit, which is capable of restraining generation of power supply noise and fluctuations in a power supply voltage by compensating for current fluctuations caused by load fluctuations of the circuit, and an RF transponder IC card using such a power supply circuit.

2. Description of the Related Art

In general, an electronic circuit such as an analog circuit or a digital circuit is operated by applying a power supply voltage thereto. Fluctuations in a current flowing through the circuit depend on the type of the circuit. In particular, large current fluctuations occur in a digital circuit such as a CPU, a logic circuit, or a memory. Such current fluctuations lead to generation of power supply noise or fluctuations in a power supply voltage. The mechanism of generation of power supply noise will be described below.

FIG. 11 is a diagram illustrating a structure of a conventional semiconductor integrated circuit 3. The semiconductor integrated circuit 3 includes a digital circuit 300 and an analog circuit 310. The digital circuit 300 includes a CPU 301 and a memory 302. The semiconductor integrated circuit 3 is externally supplied with a power supply voltage VDD via an inductor L1. The inductor L1 is a parasitic inductor which occurs in a conductor line or a bonding wire and has a value of, for example, several nanofarads. In this case, an internal power supply voltage of the semiconductor integrated circuit 3 (chip) is VDD1.

In the case where a current I1 flowing through the semiconductor integrated circuit 3 (the digital circuit 300 and the analog circuit 310) varies as illustrated in FIG. 12B, the internal power supply voltage VDD1 of the semiconductor integrated circuit 3 (chip) fluctuates at the time the current I1 varies, as illustrated in FIG. 12A.

Power supply noise generated in such a manner adversely affects a circuit operation of the analog circuit 310. For example, in the case where the analog circuit 310 is a comparator having a hysteresis property, a comparison value varies due to fluctuations in the power supply voltage VDD1, so that malfunction in the analog circuit 310 may be caused. In the case where the analog circuit 310 is an amplifier, there arises a problem that a power supply fluctuation component is added to the power supply voltage VDD1 and the quality of a signal output from the amplifier deteriorates. Specific examples of malfunction and property deterioration of an analog circuit will be given below.

FIG. 13 is a graph illustrating input-output characteristics of a comparator having a hysteresis property. In general, a comparator is in a HIGH state when an input voltage is higher than a reference voltage, and the comparator is in a LOW state when the input voltage is lower than the reference voltage. In contrast, in a comparator having a hysteresis property, as illustrated in FIG. 13, an output signal Vout is in a HIGH state when an input voltage (an input signal Vin) is equal to or higher than a voltage VH which is higher than a reference voltage Vref1 by an offset voltage, and the output signal Vout is in a LOW state when the input voltage (the input signal Vin) is equal to or lower than a voltage VL which is lower than the reference voltage Vref1 by the offset voltage. In the case where an output of the comparator having a hysteresis property is in the HIGH state and a voltage input to the comparator is equal to the reference voltage Vref1, when the input voltage is reduced to be equal to or lower than the voltage VL due to generation of power voltage noise, the output of the comparator is changed from the HIGH state to the LOW state and a value of the output will not return to the previous value (HIGH state).

In order to solve such a problem, conventionally, a method which uses separate power supplies for an analog circuit and a digital circuit or provides a capacitance section having a large capacitance between the power supply voltage VDD1 section and a ground VSS in the semiconductor integrated circuit 3 has been used to restrain fluctuations in a power supply voltage.

However, the above-described methods lead to an increase in the number of pins (terminals) of the semiconductor integrated circuit 3 (chip) or an increase in area of the capacitance section provided in the semiconductor integrated circuit 3 (chip). It is preferable that a value of the capacitance is equal to or more than 1 $\mu$F, but a value of capacitance which can be provided in the semiconductor integrated circuit 3 (chip) is about 1 nF at most in the case where a standard CMOS process is used, and this is not very effective for great load fluctuations of the semiconductor integrated circuit 3 (chip).

SUMMARY OF THE INVENTION

A power supply circuit of the present invention includes: a current detection circuit connected between a first power supply voltage section for applying a first power supply voltage to a first electronic circuit and a second power supply voltage section for applying a second power supply voltage to a second electronic circuit, the current detection circuit having a monitor terminal for monitoring a current flowing from the first power supply voltage section to the second power supply voltage section; and a current compensation circuit connected to the first power supply voltage section and the monitor terminal, the current compensation circuit controlling a compensation current flowing from the first power supply voltage section to a ground based on the monitored current to compensate for current fluctuations caused by load fluctuations of the second electronic circuit, thereby achieving an objective of the present invention.

According to above-described structure, the current detection circuit is used to monitor the current flowing through the second power supply voltage section to detect current fluctuations caused by load fluctuations of a digital circuit, etc., and the power supply compensation circuit is used to compensate for the current fluctuations to restrain generation of power supply noise and fluctuations in a power supply voltage, thereby realizing a high-performance power supply circuit which generates lower noise and can restrain malfunction of a circuit (e.g., an analog circuit) which is liable to be adversely affected by the generation of power supply noise and fluctuations in a power supply voltage or a deterioration in the quality of a signal output from a circuit (e.g., an analog circuit).

The current detection circuit includes a linear regulator including an operational amplifier having a noninverting input terminal and an output terminal, a transistor, and first and second resistances, the transistor has a source connected to the first power supply voltage section, a gate connected to the output terminal of the operational amplifier, and a drain connected to the second power supply voltage section, the first and second resistances are connected in series between the second power supply voltage section and the ground, and a contact point between the first and second resistances is connected to the noninverting input terminal of the operational amplifier, and the operational amplifier noninverting input terminal is connected to a reference voltage section and the operational amplifier output terminal functions as the monitor terminal.

According to the above-described structure, as described in the following Example 1, it is possible to monitor current fluctuations caused by load fluctuations of a digital circuit, etc., using the linear regulator.

The current detection circuit includes a third resistance connected between the first power supply voltage section and the second power supply voltage section, and a monitor terminal on the second power supply voltage section side.

According to the above-described structure, as described in the following Example 2, it is possible to monitor current fluctuations caused by load fluctuations of a digital circuit, etc., using the current detection circuit.

The current compensation circuit includes: a subtraction circuit for producing a difference current between a prescribed current and a current controlled by the monitor terminal; and a current circuit for causing a compensation current proportional to the difference current to flow from the first power supply voltage section to a ground.

According to the above-described structure, as described in the following Example 1, it is possible to compensate for current fluctuations of a digital circuit, etc., using the power supply compensation circuit.

The current compensation circuit includes: a reference voltage generation circuit for producing a reference voltage; a differential amplifier circuit for producing a current corresponding to the sum of a prescribed current and a difference current, the difference current being proportional to a value of a difference voltage representing a difference between the reference voltage and a voltage at the monitor terminal; and a current circuit for causing a compensation current proportional to the sum of the prescribed current and the difference current to flow from the first power supply voltage section to a ground.

According to the above-described structure, as described in the following Example 2, it is possible to compensate for current fluctuations of a digital circuit, etc., using the power supply compensation circuit.

The first power supply voltage section is connected to an analog circuit.

According to the above-described structure, it is possible to restrain malfunction of an analog circuit which is liable to be adversely affected by fluctuations in a power supply voltage or a deterioration in the quality of a signal output from a circuit.

The second power supply voltage section is connected to a digital circuit.

According to the above-described structure, it is possible to detect current fluctuations caused by load fluctuations of a digital circuit, etc., in which large current fluctuations occur.

The current circuit causes the compensation current to flow via a fourth resistance to a ground.

According to the above-described structure, it is possible to restrain generation of power supply noise by compensating for fluctuations in a current flowing through the second power supply voltage section. The sum of the compensation current and the current flowing through the second power supply voltage section may not be constant. In this case, power supply noise to be generated can be reduced by partially compensating for current fluctuations.

The sum of a current flowing from the first power supply voltage section to the second power supply voltage section and the compensation current flowing from the first power supply voltage section to a ground is constant.

According to the above-described structure, it is possible to restrain a current which is caused to unnecessarily flow through a current circuit due to a variance in element properties, etc., of a transistor provided in the current circuit.

An RF transponder IC card of the present invention includes: a coil antenna; and a semiconductor integrated circuit including a tuning capacitance section having a tuning capacitance, a charging capacitance section having a charging capacitance, a rectifier circuit, an analog circuit, a digital circuit, and a power supply circuit which includes a current detection circuit connected between a first power supply voltage section for applying a first power supply voltage to a first electronic circuit and a second power supply voltage section for applying a second power supply voltage to a second electronic circuit, the current detection circuit having a monitor terminal for monitoring a current flowing from the first power supply voltage section to the second power supply voltage section and a current compensation circuit connected to the first power supply voltage section and the monitor terminal, the current compensation circuit controlling a compensation current flowing from the first power supply voltage section to a ground based on the monitored current to compensate for current fluctuations caused by load fluctuations of the second electronic circuit. The coil antenna is connected in parallel with the tuning capacitance section to an input of the rectifier circuit, the rectifier circuit has an output connected to the charging capacitance section and produces the first power supply voltage supplied to the analog circuit and the power supply circuit produces the second power supply voltage supplied from the first power supply voltage section to the digital circuit, thereby achieving an objective of the present invention.

According to the above-described structure, it is possible to restrain malfunction of an analog circuit, etc., caused by load fluctuations in a digital circuit, etc., or the deterioration in the quality of a signal output from the analog circuit, thereby realizing a high-performance RF transponder IC card.

The analog circuit includes a demodulator circuit.

According to the above-described structure, as described in the following Example 3, it is possible to realize a high-performance RF transponder IC card.

The semiconductor integrated circuit further includes a modulator circuit connected in parallel with the tuning capacitance section to an input of the rectifier circuit.

According to the above-described structure, as described in the following Example 4, it is possible to realize a high-performance RF transponder IC card having a modulator circuit.

The modulator circuit modulates a circuit impedance using a modulating signal.

According to the above-described structure, as described in the following Example 4, it is possible to realize a high-performance RF transponder IC card having a full-wave rectifier.

The rectifier circuit is a full-wave rectifier circuit.

According to the above-described structure, as described in the following Example 4, it is possible to realize a high-performance RF transponder IC card having a full-wave rectifier. A half-wave rectifier may also be used as the rectifier. In such a case, it is possible to realize a high-performance RF transponder IC card having a half-wave rectifier.

Thus, the invention described herein makes possible the advantages of providing: a high-performance power supply circuit and a high-performance RF transponder IC card which can restrain the generation of power supply noise and fluctuations in a power supply voltage by compensating for current fluctuations caused by load fluctuations of a digital circuit or the like and which can restrain the malfunction of a circuit (e.g., an analog circuit) which is liable to be adversely affected by the generation of power supply noise and fluctuations in a power supply voltage or a deterioration in the quality of a signal output from a circuit (e.g., an analog circuit).

These and other advantages of the present invention will become apparent to those skilled in the art upon reading and understanding the following detailed description with reference to the accompanying figures.

DESCRIPTION OF THE PREFERRED EMBODIMENTS

Figure 1:
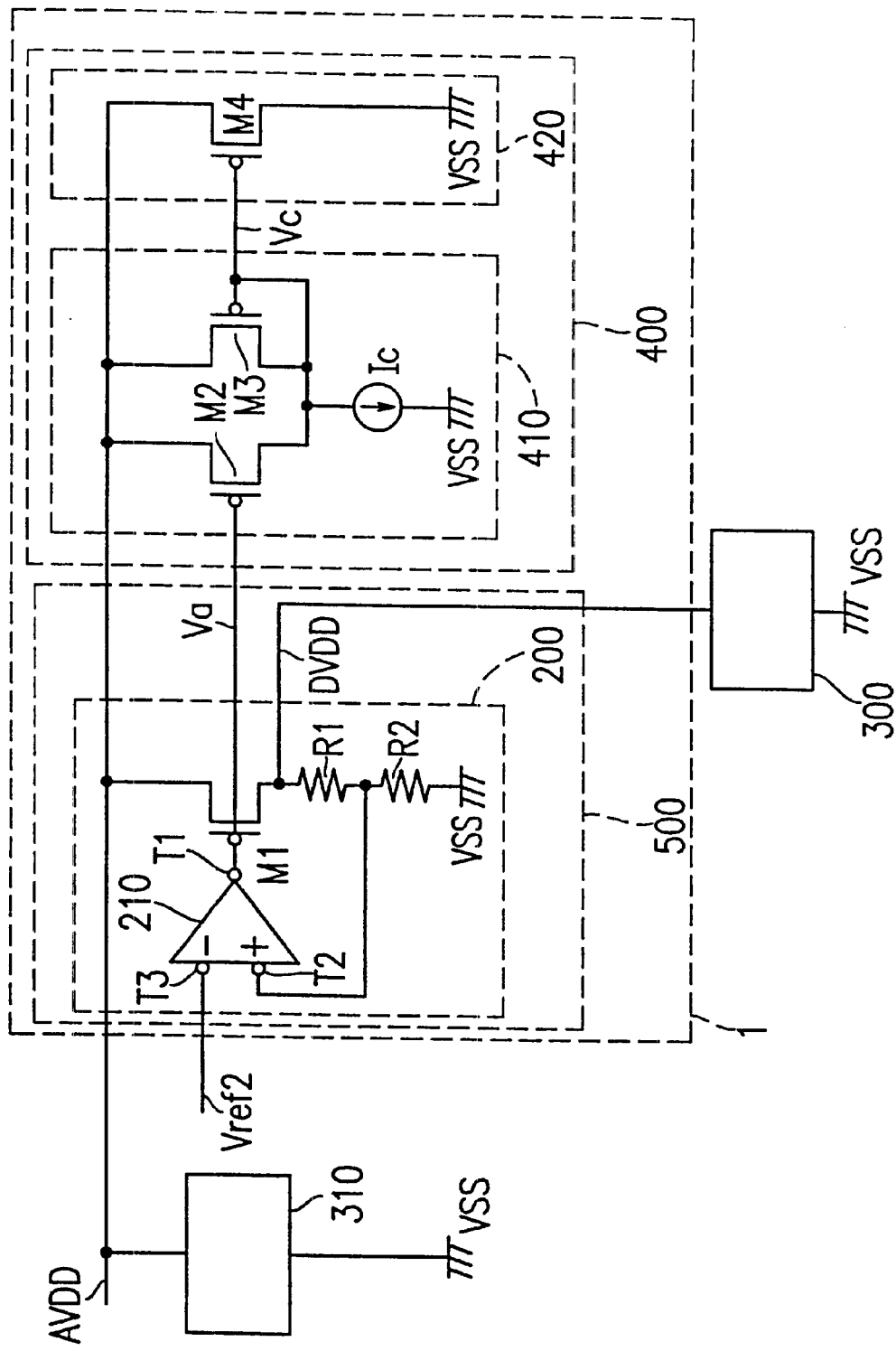
FIG. 1 is a diagram illustrating a structure of a power supply circuit according to Example 1 of the present invention.

Hereinafter, examples of the present invention will be described with reference to the accompanying drawings. In the drawings described below, components similar to those of the above-described conventional components will be denoted by the same reference numerals, and thus detailed explanation thereof will be omitted.

EXAMPLE 1

FIG. 1 is a diagram illustrating a structure of a power supply circuit 1 according to Example 1 of the present invention. The power supply circuit 1 includes a current detection circuit 500 and a current compensation circuit 400. A digital circuit 300 is supplied with a digital power supply voltage DVDD as a power supply voltage and an analog circuit 310 is supplied with an analog power supply voltage AVDD as a power supply voltage.

The current detection circuit 500 includes a linear regulator 200 as a main component. The linear regulator 200 includes resistances R1 and R2, an operational amplifier 210, and a pMOS transistor M1. The transistor M1 has a source connected to an analog power supply voltage AVDD section, a gate connected to an output terminal of the operational amplifier 210, and a drain connected to a digital power supply voltage DVDD section. The output terminal of the operational amplifier 210 is a monitor terminal T1 (to which a monitor voltage Va is applied) for monitoring a current flowing through the digital power supply voltage DVDD section (i.e., a current flowing through the digital circuit 300). The resistance R1 is connected to the digital power supply voltage DVDD section and a noninverting input terminal T2 of the operational amplifier 210. The resistance R2 is connected to a ground VSS and the noninverting input terminal T2 of the operational amplifier 210.

The current compensation circuit 400 includes a subtraction circuit 410 and a current circuit 420. The subtraction circuit 410 includes a prescribed current source Ic, a transistor M2, and a transistor M3. The current source Ic is connected to the ground VSS, a drain of the transistor M2, and a drain of a transistor M3. Each of the transistors M2 and M3 has a source connected to the analog power supply voltage AVDD section. The transistor M2 has a gate connected to the monitor terminal T1 (to which a monitor voltage Va is applied) of the linear regulator 200. The transistor M3 has a gate connected to the drain thereof to form a control voltage Vc section for the current circuit 420. The current circuit 420 includes the transistor M4. The transistor M4 has a source connected to the analog power supply voltage AVDD section, a drain connected to the ground VSS, and the gate connected to the control voltage Vc section.

In the case where a noninverting input terminal T3 of the operational amplifier 210 is externally supplied with a reference voltage Vref2, the digital power supply voltage DVDD is represented by:

$$DVDD=V\text{ref}\times(R1+R2)/R2 \quad (1).$$

In this case, when a current flowing through the resistances R1 and R2 is set so as to be much lower than a current I1 (a current flowing to the digital circuit 300), currents I2, I3, and I4 flowing through the transistors M2, M3, and M4, respectively, are represented by:

$$I2=n\times I1 \quad (2)$$

$$I3=Ic-n\times I1 \quad (3),$$

and $$I4=m\times(Ic-n\times I1) \quad (4).$$

In the subtraction circuit 410, the difference current I3 between the prescribed current Ic and the current I2 controlled by the monitor terminal T1 (to which a monitor voltage Va is applied) is produced. In the current circuit 420, the current I4 proportional to the difference current I3 flows as a compensation current from the analog power supply voltage AVDD section to the ground VSS. In the above-described expressions, n is a size ratio of the transistor M1 to the transistor M2, and m is a size ratio of the transistor M3 to the transistor M4. I1 is a current flowing through the transistor M1. For example, when gate widths of the transistors M1, M2, M3, and M4 are widths W1, W2, W3, and W4, respectively, and gate lengths of the transistors M1, M2, M3, and M4 are lengths L1, L2, L3, and L4, respectively, n and m are represented by:

$$n=(W2\times L1)/(L2\times W1) \quad (5),$$

and $$m=(W4\times L3)/(L4\times W3) \quad (6).$$

In the expression (4), when the following expressions:

$$Ic=n\times I0,$$

and $$m=1/n$$

are given, the current I4 flowing through the transistor M4 is represented by:

$$I4=I0-I1.$$

In this case, when the current I1 flowing to the digital circuit 300 is increased by a value of ΔI1 to I1+ΔI1, I4 is I0−I1−ΔI1, and thus a current compensating for fluctuations in the current I1 flowing to the digital circuit 300 flows through the current circuit 420. In FIG. 1, a current flowing from the analog power supply voltage AVDD section to the analog circuit 310 has a value of the sum (I0+Ic) of the current I1 flowing to the digital circuit 300, the current Ic flowing through the subtraction circuit 410, and the current (I0−I1) flowing through the current compensation circuit 420. As a result, except for the current flowing to the analog circuit 310, the currents flowing from the analog power supply voltage AVDD section are constant. This means that the noise generated in the analog power supply voltage AVDD due to load fluctuations of the digital circuit 300 is reduced.

As can be seen from the description above, in Example 1, it is not necessary to use separate power supplies for a digital circuit and an analog circuit for the purpose of restraining fluctuations in a power supply voltage, thereby reducing the number of pins of a chip. Moreover, it is not necessary to provide a capacitance section having a great capacitance in the chip between a digital power supply voltage section and the ground for the purpose of restraining fluctuations in a power supply voltage, thereby preventing an area of a capacitance formed in the semiconductor integrated circuit (chip) from being increased. As a result, a high-performance power supply circuit which can be easily implemented on a chip and have low power supply noise can be realized.

EXAMPLE 2

Figure 2:
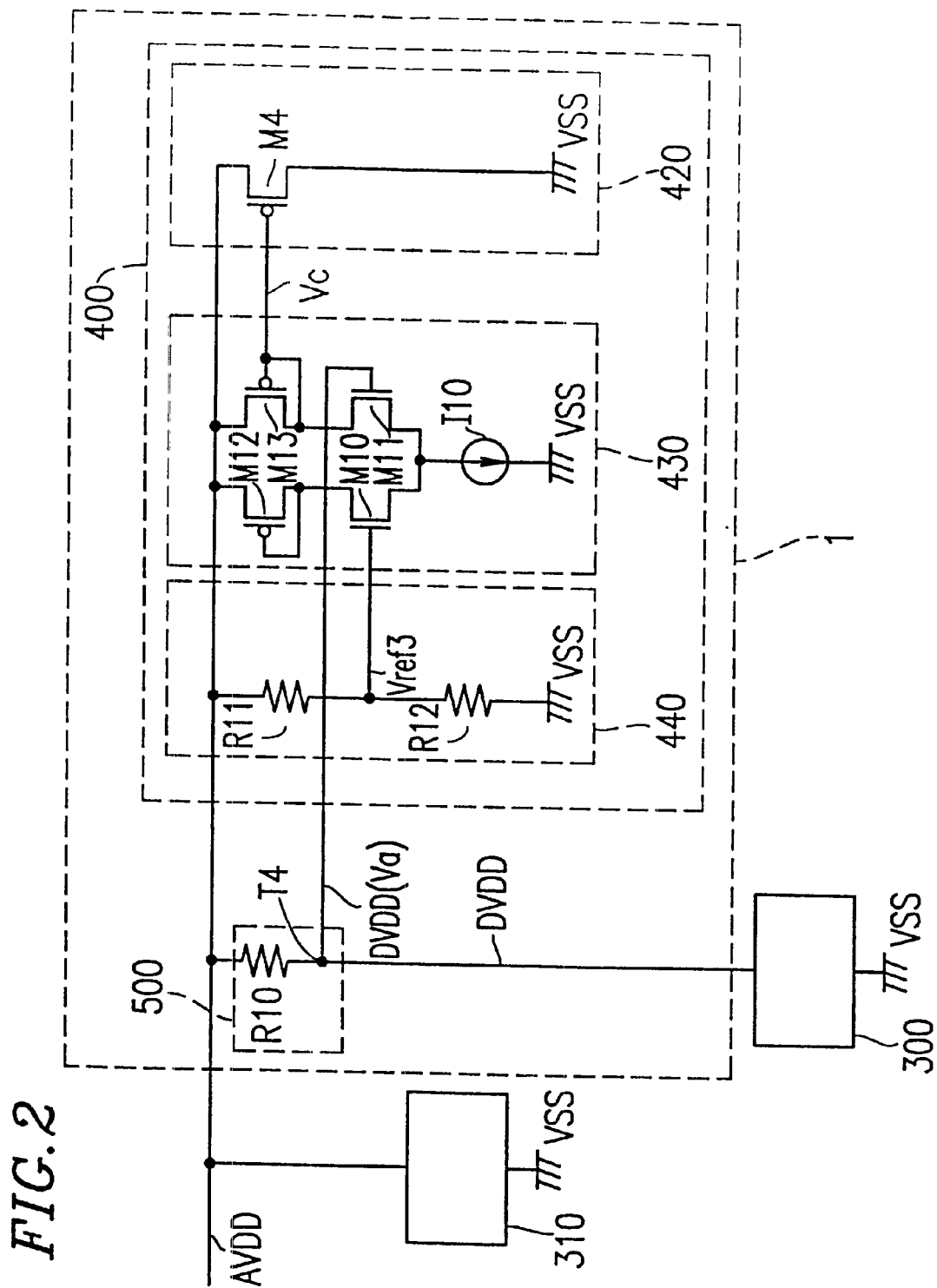
FIG. 2 is a diagram illustrating a structure of a power supply circuit according to Example 2 of the present invention.

FIG. 2 is a diagram illustrating a structure of a power supply circuit 1 according to Example 2 of the present invention. The power supply circuit 1 includes a current detection circuit 500 and a current compensation circuit 400. The digital circuit 300 is supplied with the digital power supply voltage DVDD as a power supply voltage and the analog circuit 310 is supplied with the analog power supply voltage AVDD as a power supply voltage.

The current detection circuit 500 includes a resistance R10 connected between the analog power supply voltage AVDD section and the digital power supply DVDD section and has, on the digital power supply voltage DVDD section side, a monitor terminal T4 (to which a monitor voltage Va is applied) for monitoring a current flowing through the digital power supply voltage DVDD section (i.e., a current flowing to the digital circuit 300).

The current compensation circuit 400 includes a reference voltage generation circuit 440, a differential amplifier circuit 430, and a current circuit 420. The reference voltage generation circuit 440 includes resistances R11 and R12 connected in series between the analog power supply voltage AVDD section and a ground VSS. The reference voltage generation circuit 440 outputs a voltage which is produced based on resistance division between the resistances R11 and R12 as a reference voltage Vref3. The differential amplifier circuit 430 includes nMOS transistors M10 and M11, pMOS transistors M12 and M13, and a current source I10. The current source I10 is connected to the ground VSS and sources of the transistors M10 and M11. The transistor M10 has a drain connected to a drain of the transistor M12. The transistor M11 has a drain connected to a drain of the transistor M13. The transistors M12 and M13 are separately diode-connected (to have a structure in which a source and a gate are connected to serve as a cathode and a drain serves as an anode). The drain of the transistor M11, and a gate and the drain of the transistor M13 are connected to a control voltage Vc section of the current circuit 420. The transistors M12 and M13 have respective sources connected to the analog power supply voltage AVDD section. The transistor M11 has a gate connected to the monitor terminal T4 (to which a monitor voltage Va is applied). The transistor M10 has a gate connected to the reference voltage Vref3 section. The current circuit 420 includes a transistor M4 which has a source connected to the analog power supply voltage AVDD section, a drain connected to the ground VSS, and a gate connected to the control voltage Vc section. The current circuit 420 controls the control voltage Vc in the differential amplifier circuit 430 so as to control a current flowing from the analog power supply voltage AVDD section to the ground VSS.

In the case where a load resistance is Rmax when a maximum current flows through the digital circuit 300, the relationship among the resistances R10 to R12 and Rmax is represented by:

$$(R10/(R\text{max}+R10))/2=R11/(R11+R12) \quad (7).$$

For example, when respective values of Rmax, R10, R11, and R12 are given as follows: Rmax=90Ω, R10=10Ω, R11=10 kΩ, and R12=190 kΩ, the relationship between R10 and R11 is given as in R11/R10=1000 for the purpose of lowering a consumption current.

When the analog power supply voltage AVDD is 3V, the reference voltage Vref3 is 2.85V, the power supply voltage DVDD is 2.7V at the maximum digital load, and the maximum load current of the digital circuit 300 is 30 mA. In this case, when a mirror ratio (equivalent to the size ratio of Example 1) of the transistor M13 to the transistor M4 is M and current gain of the differential amplifier circuit 430 is A, a current I4 flowing through the transistor M4 is represented by:

$$I4 = M \times (A \times (DVDD - Vref3) + I10/2) \qquad (8).$$

This means that the current I4 flowing through the transistor M4 is proportional to the sum of a current (A×(DVDD−Vref3)) which is caused to flow by a difference between the power supply voltage DVDD and the reference voltage Vref3 and a prescribed current I10/2.

In the case where respective values of A, I10, and M are given as follows: A=0.001, I10=300 μA, and M=100, when the load current flowing to the digital circuit 300 is maximum (i.e., 30 mA), a current flowing through the current circuit 420 is approximately 0 mA, and when the load current flowing to the digital circuit 300 is minimum (i.e., 0 mA), the current flowing through the current circuit 420 is approximately 30 mA. As a result, except for the current flowing from the analog power supply voltage AVDD section to the analog circuit 310, the currents flowing through the semiconductor integrated circuit 3 are always constant at approximately 30 mA without being affected by load fluctuations of the digital circuit 300. The currents flowing through the differential amplifier circuit 430 and the reference voltage generation circuit 440 are very low in comparison to the current flowing through the currents circuit 420 and the digital circuit 300, and thus is negligible. As a result, it is possible to restrain generation of noise in the power supply voltage AVDD section caused by load fluctuations of the digital circuit 300, thereby realizing a high-performance power supply circuit.

As can be seen from the description above, in Example 2, it is not necessary to use separate power supplies for a digital circuit and an analog circuit for the purpose of restraining fluctuations in a power supply voltage, thereby reducing the number of pins of a chip. Moreover, it is not necessary to form a capacitance section having a great capacitance in the chip between a digital power supply voltage section and the ground for the purpose of restraining fluctuations in a power supply voltage, thereby preventing an area of a capacitance formed in the semiconductor integrated circuit (chip) from being increased. As a result, a high-performance power supply circuit which can be easily implemented on a chip and have low power supply noise can be realized.

Figure 3:
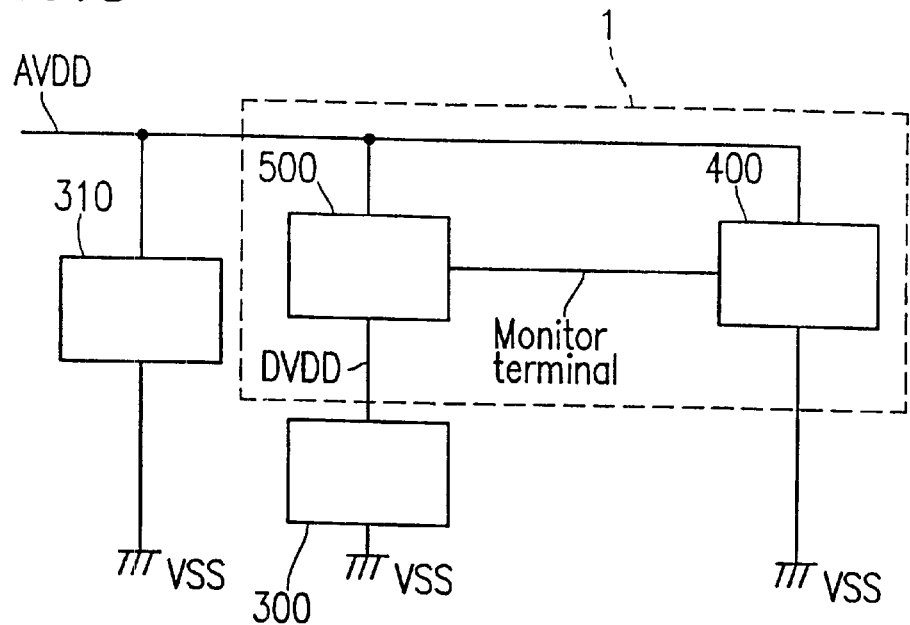
FIG. 3 is a diagram illustrating an exemplary structure of a power supply circuit according to the present invention.

The present invention is not limited to specific examples of the current detection circuit 500 and the current compensation circuit 400 described above with reference to Examples 1 and 2. As illustrated in FIG. 3, any power supply circuit falls within the scope of the present invention as long as the power supply circuit monitors a current flowing through the digital power supply voltage DVDD section (i.e., a current flowing to the digital circuit 300) using the current detection circuit 500 and controls a compensation current flowing from the analog power supply voltage AVDD section to the ground VSS using the current compensation circuit 400 so as to compensate for current fluctuations of the digital circuit 300.

In Example 2, the sum of a compensation current and a current flowing through the digital power supply voltage DVDD section is constant, but may not be constant. Power supply noise to be generated can be reduced by partially compensating for fluctuations in a current flowing through the digital power supply voltage DVDD section by the current compensation circuit 400.

Figure 4:
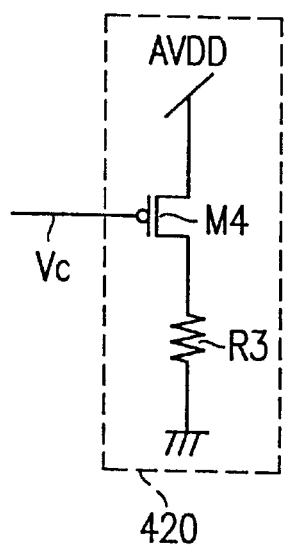
FIG. 4 is a diagram illustrating a structure of another power supply circuit according to Examples 1 and 2 of the present invention.

In Examples 1 and 2, the current circuit 420 has the drain of the transistor M4 directly connected to the ground VSS, but, as illustrated in FIG. 4, the drain of the transistor M4 may be connected to the ground VSS via the resistance R3. In this case, it is possible to restrain a current which is caused to unnecessarily flow through the circuit due to a variance in element properties, etc., of the transistor M4.

Moreover, in Examples 1 and 2, the digital circuit 300 and the analog circuit 310 are used, but any circuit may be used in place of the digital circuit 300 as long as the circuit cannot be affected by fluctuations in a power supply voltage, and any circuit can be used in place of the analog circuit 310 as long as the circuit is easily affected by fluctuations in a power supply voltage.

As can be seen from the description above, the present invention is highly effective in providing a high-performance power supply circuit and is extremely useful.

EXAMPLE 3

Figure 5:
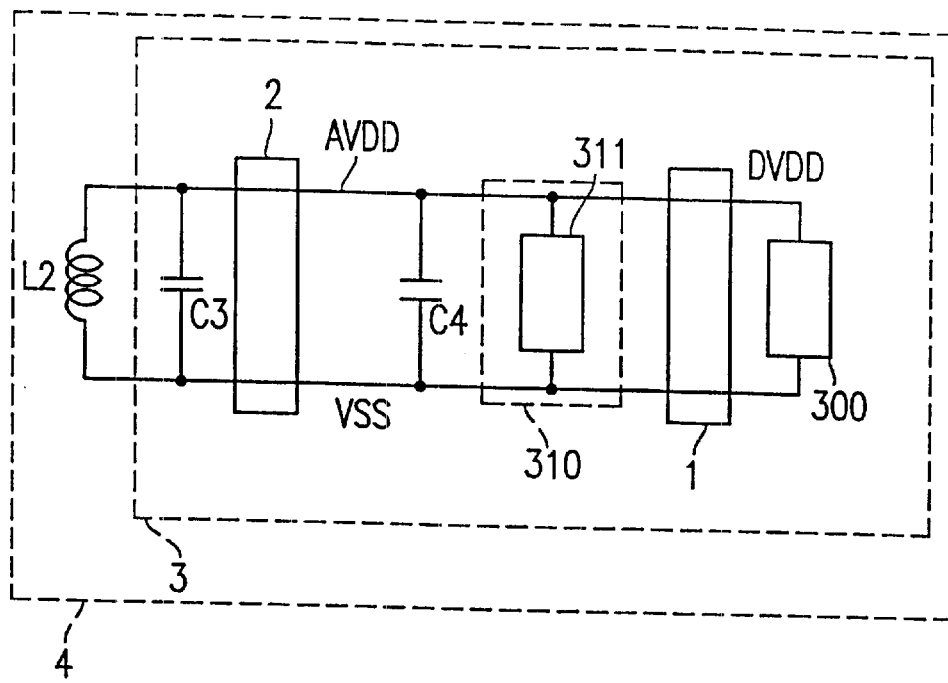
FIG. 5 is a diagram illustrating a structure of an RF transponder IC card according to Example 3 of the present invention.

FIG. 5 is a diagram illustrating a structure of an RF transponder IC card 4 according to Example 3 of the present invention. The IC card 4 includes a coil antenna L2 and a semiconductor integrated circuit 3. The semiconductor integrated circuit 3 includes a tuning capacitance C3 section having a tuning capacitance C3, a charging capacitance C4 section having a charging capacitance C4, a rectifier circuit 2, an analog circuit 310, a digital circuit 300, and a power supply circuit 1. The tuning capacitance C3 section and the coil antenna L2 are both connected in parallel to an input of the rectifier circuit 2. An output section of the rectifier circuit 2 is connected to the charging capacitance C4 section. The analog circuit 310 is supplied with a power supply voltage AVDD as a power supply voltage. The analog circuit 310 is provided with a demodulator circuit 311 retrieving an input signal from a power supply voltage AVDD section. The power supply circuit 1 produces a power supply voltage DVDD which is supplied from the power supply voltage AVDD section to the digital circuit 300. The power supply circuits described in Examples 1 and 2 can be used as the power supply circuit 1.

Figure 6:
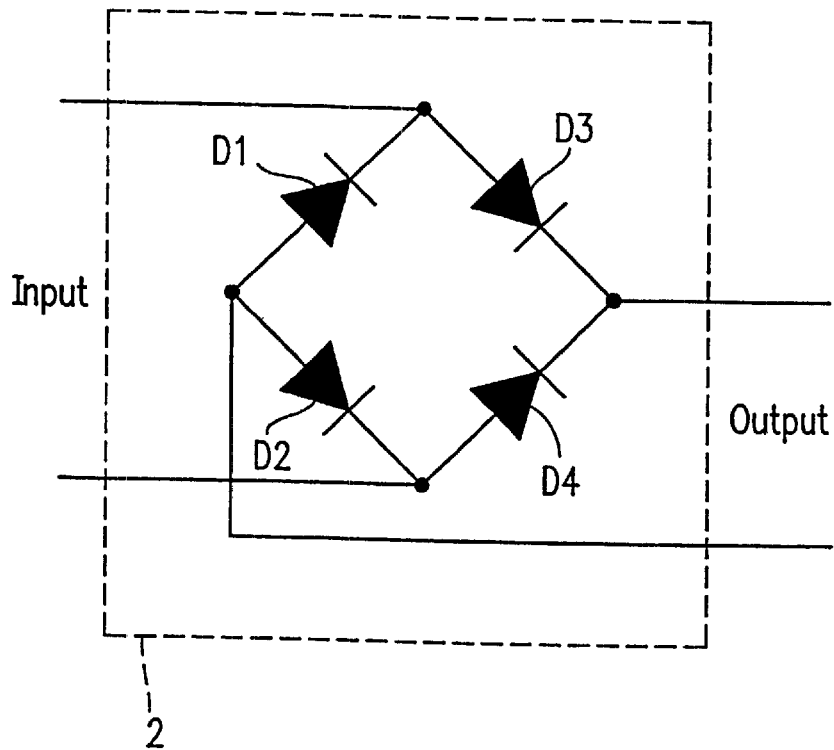
FIG. 6 is a diagram illustrating a structure of a rectifier circuit in the RF transponder IC card according to Example 3 of the present invention.
Figure 7:
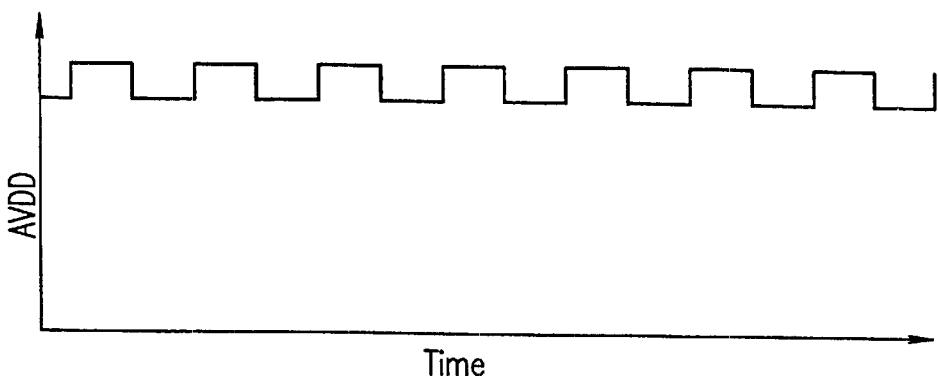
FIG. 7 is a graph illustrating a waveform of a power supply voltage AVDD after an amplitude-modulated signal is rectified in Example 3.

The coil antenna L2 receives an electric power consumed by the RF transponder IC card 4 and an input signal. The input signal to be received by the coil antenna L2 has been amplitude-modulated. A full-wave rectifier circuit using diodes D1–D4 as illustrated in FIG. 6 is used as the rectifier circuit 2. A comparator having a hysteresis property is used as the demodulator circuit 311. The input signal received by the coil antenna L2 is rectified by the rectifier circuit 2 to produce the power supply voltage AVDD having a waveform illustrated in FIG. 7. The demodulator circuit 311 extracts a signal component from the power supply voltage AVDD. The demodulator circuit 311 retrieves the power supply voltage AVDD as a signal from the power supply voltage AVDD section when a level of the power supply voltage AVDD varies to a reference level or higher.

Figure 8A:
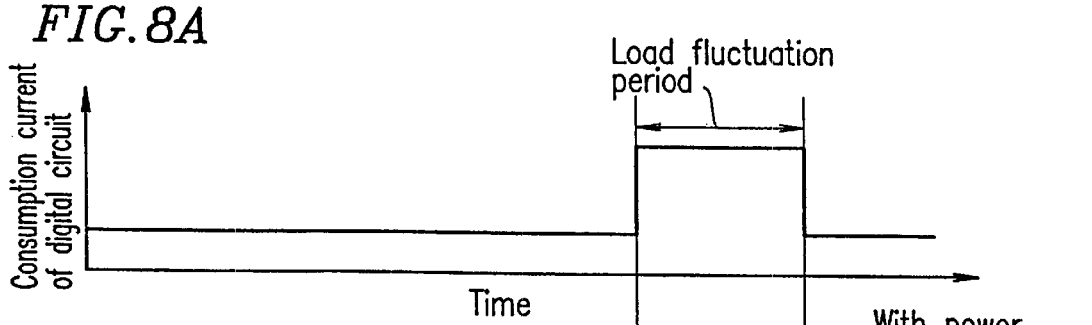
FIG. 8A is a graph illustrating a waveform of a consumption current of a digital circuit in Example 3.
Figure 8B:
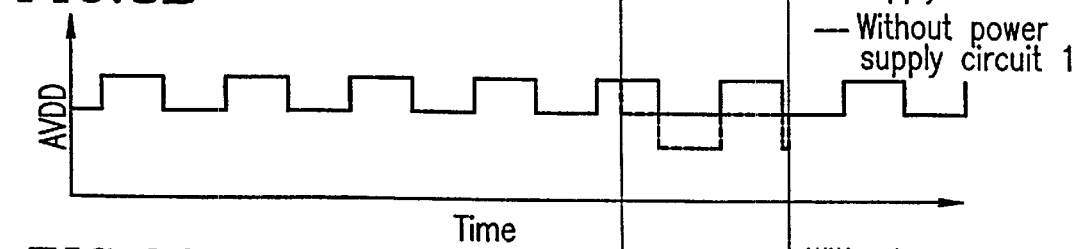
FIG. 8B is a graph illustrating respective waveforms of the power supply voltage AVDD in Example 3 with respect to the RF transponder IC card with a power supply circuit and the RF transponder IC card without a power supply circuit.
Figure 8C:
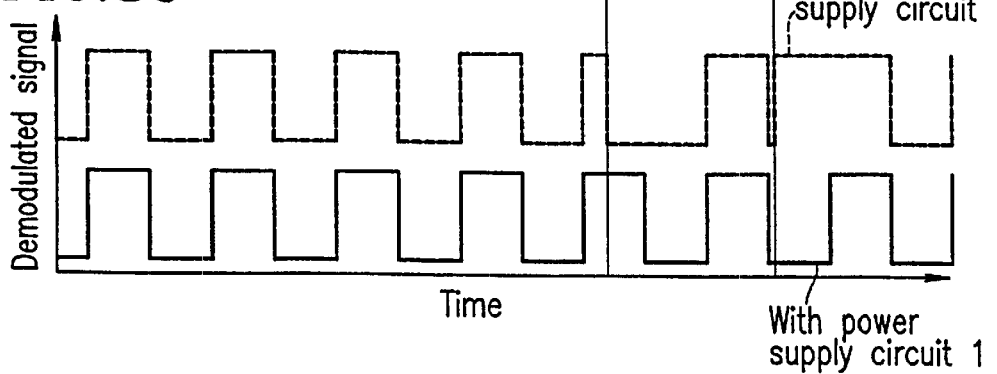
FIG. 8C is a graph illustrating respective waveforms of a demodulated signal in Example 3 with respect to the RF transponder IC card with a power supply circuit and the RF transponder IC card without a power supply circuit.

When a current fluctuates in the digital circuit 300 in a manner as illustrated in FIG. 8A, the power supply voltage AVDD has a waveform as represented by the dashed line of FIG. 8B. If the RF transponder IC card 4 does not have the power supply circuit 1, such current fluctuations (load fluctuations) in the digital circuit 300 cause a malfunction of the demodulator circuit 311, so that a demodulated signal output from the demodulator circuit 311 has a waveform as represented by the dashed line of FIG. 8C. In contrast, in the RF transponder IC card 4 with the power supply circuit 1 of Example 3, fluctuations in the power supply voltage AVDD caused by the load fluctuations of the digital circuit 300 can be restrained so that a demodulated signal output from the demodulator circuit 311 has a waveform as represented by the solid line of FIG. 8B. As a result, the demodulator circuit 311 can demodulate a signal without having a malfunction, so that the demodulated signal has a waveform as represented by the dashed line of FIG. 8C.

As can be seen from the description above, in Example 3, malfunction of the analog circuit 310 caused by load fluctuations of the digital circuit 300 can be reduced. As a result, a high-performance RF transponder IC card can be realized.

EXAMPLE 4

Figure 9:
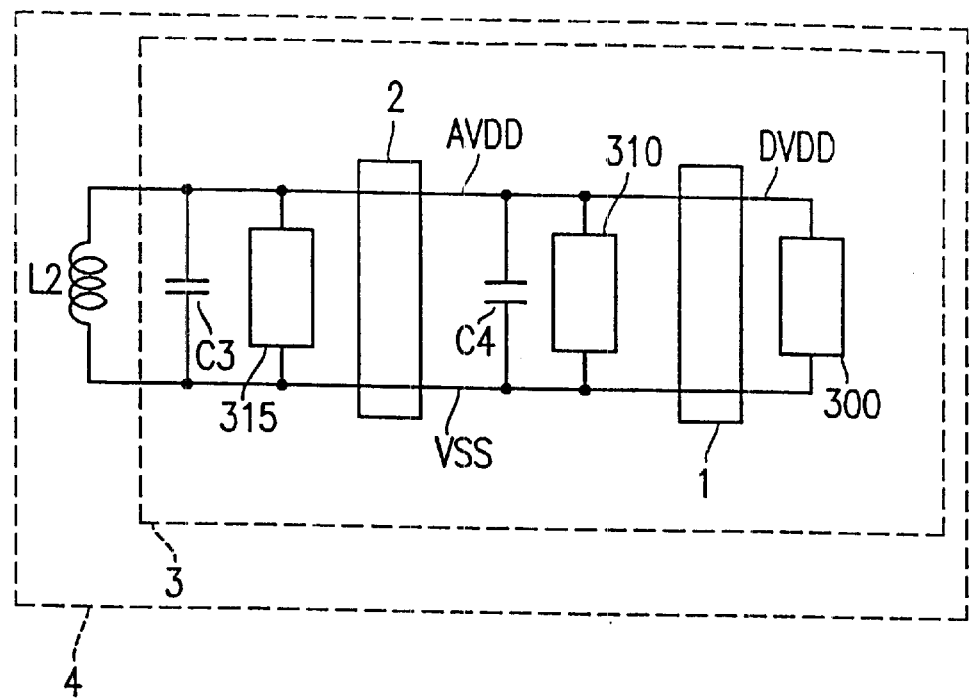
FIG. 9 is a diagram illustrating a structure of an RF transponder IC card according to Example 4 of the present invention.

FIG. 9 is a diagram illustrating a structure of an RF transponder IC card 4 according to Example 4 of the present invention. Example 4 differs from Example 3 in that the RF transponder IC card 4 according to Example 4 includes a modulator circuit 315 connected to an input of the rectifier circuit 2 in parallel with the tuning capacitance C3 section. The modulator circuit 315 modulates an impedance of the coil antenna L2 in the semiconductor integrated circuit 3 using a modulating signal.

Figure 10A:
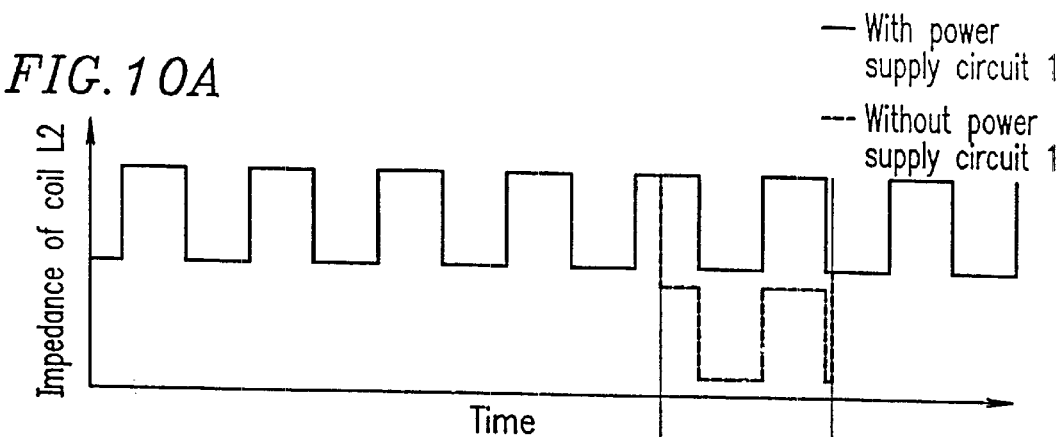
FIG. 10A is a graph illustrating respective waveforms of an impedance of a coil L2 with respect to the RF transponder IC card with a power supply circuit and the RF transponder IC card without a power supply circuit in Example 4.
Figure 10B:
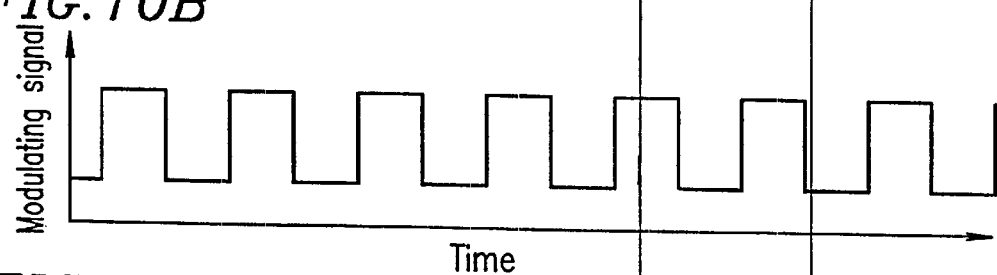
FIG. 10B is a graph illustrating a waveform of a modulating signal in Example 4.
Figure 10C:
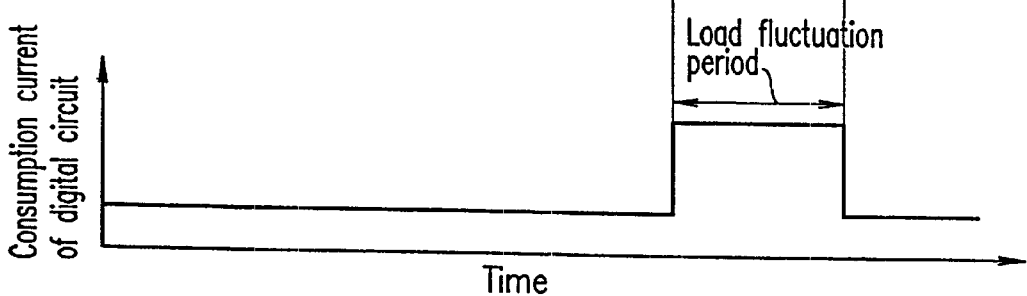
FIG. 10C is a graph illustrating a waveform of a consumption current of a digital circuit in Example 4.
Figure 11:
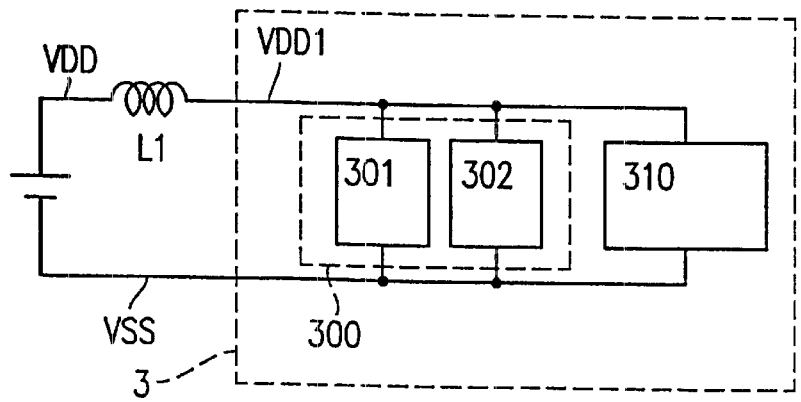
FIG. 11 is a diagram illustrating a structure of a conventional semiconductor integrated circuit.
Figure 12A:
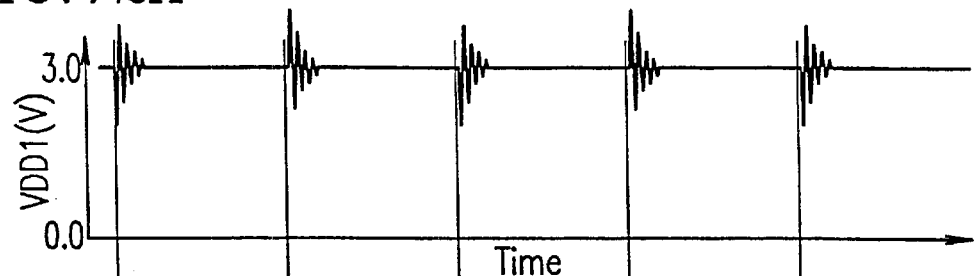
FIG. 12A is a graph illustrating a waveform of a current I1 flowing through the conventional semiconductor integrated circuit.
Figure 12B:
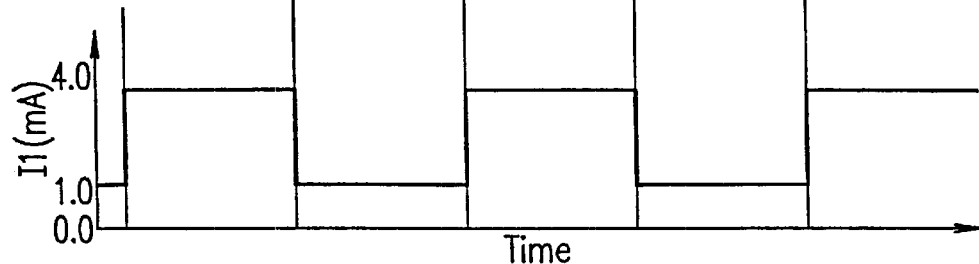
FIG. 12B is a graph illustrating a waveform of a power supply voltage VDD1 applied to the conventional semiconductor integrated circuit.
Figure 13:
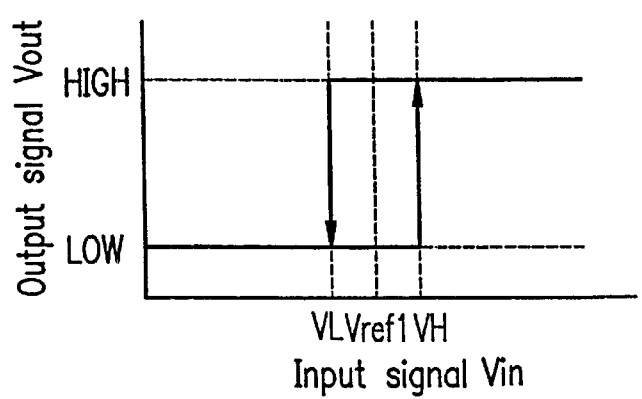
FIG. 13 is a graph illustrating input/output characteristic of a comparator having a hysteresis property.

FIG. 10A is a graph illustrating respective waveforms of an impedance of the coil L2 with respect to the RF transponder IC card 4 with a power supply circuit 1 and the RF transponder IC card 4 without the power supply circuit 1 when a modulating signal having a waveform as illustrated in FIG. 10B is input to the RF transponder IC card 4. In FIG. 10A, the solid line represents a waveform of the impedance of the coil L2 of the RF transponder IC card 4 with the power supply circuit 1 and the dashed line represents a waveform of the impedance of the coil L2 of the RF transponder IC card 4 without the power supply circuit 1. When a current fluctuates (load fluctuations), as illustrated in FIG. 10C, in the digital circuit 300 of the RF transponder IC card without the power supply circuit 1, the impedance of the coil L2 is affected in a manner as represented by the dashed line of FIG. 10A. In contrast, in the RF transponder IC card 4 with the power supply circuit 1 of Example 4, a power supply impedance caused by load fluctuations of the digital circuit 300 can be stabilized so that the power supply impedance has a waveform as represented by the solid line of the FIG. 10A.

As can be seen from the description above, in Example 3, malfunction of the analog circuit 310 caused by load fluctuations of the digital circuit 300 can be reduced. As a result, a high-performance RF transponder IC card can be realized.

The present invention is not limited to specific examples of the semiconductor integrated circuit 3 described above with reference to Examples 3 and 4. Any RF transponder IC card falls within the scope of the present invention as long as the RF transponder IC card is provided with a power supply circuit as described in Examples 1 and 2.

In Example 4, the tuning capacitance C3 section is included in the semiconductor integrated circuit 3, but it may be provided on the outside of the semiconductor integrated circuit 3 (chip) or a parasitic capacitance of the rectifier circuit 2 or the coil antenna L2 may be used in place of the tuning capacitance C3 section.

In Examples 3 and 4, a full-wave rectifier circuit is used as the rectifier circuit 2, but a half-wave rectifier circuit may be used.

As can be seen from the description above, the present invention is highly effective in providing a high-performance RF transponder IC card and is extremely useful.

As described in detail above, according to the present invention, a current detection circuit is used to monitor a current flowing through a digital power supply voltage section, etc., to detect current fluctuations caused by load fluctuations of a digital circuit, etc., and a power supply compensation circuit is used to compensate for the current fluctuations, thereby realizing a high-performance power supply circuit which generates lower noise.

Moreover, the present invention provides a power supply circuit which can realize a high-performance RF transponder IC card having a demodulator circuit and a modulator circuit.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A power supply circuit, comprising:
   a current detection circuit connected between a first power supply voltage section for applying a first power supply voltage to a first electronic circuit and a second power supply voltage section for applying a second power supply voltage to a second electronic circuit, the current detection circuit having a monitor terminal for monitoring a current flowing from the first power supply voltage section to the second power supply voltage section; and
   a current compensation circuit connected to the first power supply voltage section and the monitor terminal, the current compensation circuit controlling a compensation current flowing from the first power supply voltage section to a ground based on the monitored current to compensate for current fluctuations caused by load fluctuations of the second electronic circuit.

2. A power supply circuit according to claim 1, wherein:
   the current detection circuit includes a linear regulator including an operational amplifier having a noninverting input terminal and an output terminal, a transistor, and first and second resistances;
   the transistor has a source connected to the first power supply voltage section, a gate connected to the output terminal of the operational amplifier, and a drain connected to the second power supply voltage section;
   the first and second resistances are connected in series between the second power supply voltage section and the ground, and a contact point between the first and second resistances is connected to the noninverting input terminal of the operational amplifier; and
   the operational amplifier noninverting input terminal is connected to a reference voltage section and the operational amplifier output terminal functions as the monitor terminal.

3. A power supply circuit according to claim 1, wherein the current detection circuit includes a third resistance connected between the first power supply voltage section and the second power supply voltage section, and a monitor terminal on the second power supply voltage section side.

4. A power supply circuit according to claim 1, wherein the current compensation circuit includes:
   a subtraction circuit for producing a difference current between a prescribed current and a current controlled by the monitor terminal; and a current circuit for causing a compensation current proportional to the difference current to flow from the first power supply voltage section to a ground.

5. A power supply circuit according to claim 1, wherein the current compensation circuit includes:

a reference voltage generation circuit for producing a reference voltage;

a differential amplifier circuit for producing a current corresponding to the sum of a prescribed current and a difference current, the difference current being proportional to a value of a difference voltage representing a difference between the reference voltage and a voltage at the monitor terminal; and a current circuit for causing a compensation current proportional to the sum of the prescribed current and the difference current to flow from the first power supply voltage section to a ground.

6. A power supply circuit according to claim 1, wherein the first power supply voltage section is connected to an analog circuit.

7. A power supply circuit according to claim 1, wherein the second power supply voltage section is connected to a digital circuit.

8. A power supply circuit according to claim 4, wherein the current circuit causes the compensation current to flow via a fourth resistance to a ground.

9. A power supply circuit according to claim 5, wherein the current circuit causes the compensation current to flow via the fourth resistance to the ground.

10. A power supply circuit according to claim 1, wherein the sum of a current flowing from the first power supply voltage section to the second power supply voltage section and the compensation current flowing from the first power supply voltage section to a ground is constant.

11. An RF transponder IC card, comprising:

a coil antenna; and a semiconductor integrated circuit including a tuning capacitance section having a tuning capacitance, a charging capacitance section having a charging capacitance, a rectifier circuit, an analog circuit, a digital circuit, and a power supply circuit which includes a current detection circuit connected between a first power supply voltage section for applying a first power supply voltage to a first electronic circuit and a second power supply voltage section for applying a second power supply voltage to a second electronic circuit, the current detection circuit having a monitor terminal for monitoring a current flowing from the first power supply voltage section to the second power supply voltage section and a current compensation circuit connected to the first power supply voltage section and the monitor terminal, the current compensation circuit controlling a compensation current flowing from the first power supply voltage section to a ground based on the monitored current to compensate for current fluctuations caused by load fluctuations of the second electronic circuit wherein:

the coil antenna is connected in parallel with the tuning capacitance section to an input of the rectifier circuit;

the rectifier circuit has an output connected to the charging capacitance section and produces the first power supply voltage supplied to the analog circuit; and the power supply circuit produces the second power supply voltage supplied from the first power supply voltage section to the digital circuit.

12. An RF transponder IC card according to claim 11, wherein the analog circuit includes a demodulator circuit.

13. An RF transponder IC card according to claim 11, wherein the semiconductor integrated circuit further includes a modulator circuit connected in parallel with the tuning capacitance section to an input of the rectifier circuit.

14. An RF transponder IC card according to claim 13, wherein the modulator circuit modulates a circuit impedance using a modulating signal.

15. An RF transponder IC card according to claim 11, wherein the rectifier circuit is a full-wave rectifier circuit.

* * * * *